(12) United States Patent
Yamada

(10) Patent No.: US 7,997,622 B2
(45) Date of Patent: Aug. 16, 2011

(54) SADDLE-RIDE TYPE FOUR-WHEELED VEHICLE

(75) Inventor: Masashi Yamada, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 30 days.

(21) Appl. No.: 12/553,218

(22) Filed: Sep. 3, 2009

(65) Prior Publication Data

US 2010/0059978 A1 Mar. 11, 2010

(30) Foreign Application Priority Data

Sep. 5, 2008 (JP) ................................. 2008-229130

(51) Int. Cl.
*B60P 3/22* (2006.01)
(52) U.S. Cl. .................. 280/835; 280/834; 280/833
(58) Field of Classification Search .............. 280/835, 280/834, 833
See application file for complete search history.

(56) References Cited

U.S. PATENT DOCUMENTS

| | | | | |
|---|---|---|---|---|
| 6,253,790 B1 * | 7/2001 | Hara | ........................ | 137/565.17 |
| 7,484,766 B2 * | 2/2009 | Iwasaki | ........................ | 280/833 |
| 7,624,829 B2 * | 12/2009 | Kubota | ........................ | 180/69.4 |
| 7,681,682 B2 * | 3/2010 | Miyashiro | ..................... | 180/219 |
| 7,690,360 B2 * | 4/2010 | Kuji | ............................... | 123/509 |
| 2005/0126546 A1 * | 6/2005 | Yagisawa | ....................... | 123/509 |
| 2006/0273572 A1 | 12/2006 | Yamamura | | |

* cited by examiner

*Primary Examiner* — Paul N Dickson
*Assistant Examiner* — Marlon A Arce
(74) *Attorney, Agent, or Firm* — Keating & Bennett, LLP

(57) ABSTRACT

A saddle-ride type four-wheeled vehicle has a structure that increases a tank capacity of a fuel tank and reduces a moment acting on a fixing position of a fuel pump disposed in the fuel tank. The saddle-ride type four-wheeled vehicle includes a fuel tank located above the head cover of the engine, and a fuel pump disposed in the fuel tank. The lower surface portion of the fuel tank includes, at a more forward position than the head cover, a deep bottom portion situated at a lowest position in the lower surface portion. The upper surface portion of the fuel tank includes, at a more rearward position than the deep bottom portion, an inclined portion arranged to extend rearward and obliquely downward. An upper end of the fuel pump is fixed to the inclined portion, and the fuel pump is arranged to extend forward and obliquely downward from the inclined portion toward the deep bottom portion.

6 Claims, 8 Drawing Sheets

SADDLE-RIDE TYPE FOUR-WHEELED VEHICLE

The present application claims priority from Japanese patent application JP2008-229130 filed on Sep. 5, 2008, the entire contents of which are hereby incorporated by reference into this application.

BACKGROUND OF THE INVENTION

1. Field of the Invention

The present invention relates to a saddle-ride type four-wheeled vehicle including an all-terrain vehicle, for example, and more particularly, to arrangements of a fuel tank and a fuel pump included in such a vehicle.

2. Description of the Related Art

Conventionally, there is a saddle-ride type four-wheeled vehicle that is used mainly on rough terrain. As such a saddle-ride type four-wheeled vehicle, there is one having such a structure where the engine is located between front and rear wheels, that is, at a center portion of a vehicle (See, for example, US 2006/0273572).

In the saddle-ride type four-wheeled vehicle disclosed in US 2006/0273572, the cylinder is situated on the crankcase, and the fuel tank, which is molded of a resin, is located over the head cover situated at a top of the cylinder. In this saddle-ride type four-wheeled vehicle, the fuel tank extends rearward beyond the head cover, and the deepest portion in the fuel tank (hereinafter, referred to as deep bottom portion) is situated further rearward than the head cover. According to the above-mentioned fuel tank, by lowering a position of the deep bottom portion, it is possible to increase a capacity of the fuel tank.

Further, in the saddle-ride type four-wheeled vehicle disclosed in US 2006/0273572, a fuel pump in the fuel tank is suspended in a vertical direction from an upper surface of the fuel tank, and a lower end of the fuel pump is situated in the deep bottom portion.

SUMMARY OF THE INVENTION

The inventor of preferred embodiments of the present invention described and claimed in the present application conducted an extensive study and research regarding a saddle-ride type four-wheeled vehicle, such as the one described above, and in doing so, discovered and first recognized new unique challenges and previously unrecognized possibilities for improvements as described in greater detail below.

In the saddle-ride type four-wheeled vehicle, when the vehicle climbs over large obstacles, in some cases, the vehicle has rotational pitch motion around the center portion of the vehicle in a front-rear direction thereof. Specifically, in the vehicle having an engine located at the center portion of the vehicle, in some cases, a front portion of the vehicle is raised with respect to the engine located at the center portion of the vehicle, and a rear portion of the vehicle is relatively lowered. Further, in some cases, the front portion of the vehicle is lowered with respect to the engine located at the center portion of the vehicle, and the rear portion of the vehicle is relatively raised.

When the saddle-ride type four-wheeled vehicle with a fuel tank located over the head cover experiences pitch motion in such a manner, a force in the front-rear direction acts on the fuel pump. In other words, in such a vehicle, since the fuel tank is located over the engine situated at the center portion of pitch motion (rotational motion) of the vehicle, the fuel tank sways in the front-rear direction around the engine when the vehicle experiences rotational pitch motion around the engine, and hence the force in the front-rear direction acts on the fuel pump.

In the vehicle having the fuel pump arranged in the vertical direction, such as the saddle-ride type four-wheeled vehicle of US 2006/0273572, when the force in the front-rear direction acts on the fuel pump, a large moment is generated at a fixing position of the fuel pump formed on the upper surface of the fuel tank. In particular, when the fuel tank is made of a resin as in US 2006/0273572, the rigidity of the fuel tank is not high, and hence it is not preferred that the large moment be generated at the fixing position of the fuel pump.

In order to overcome the previously unrecognized and unsolved challenges described above, a preferred embodiment of the present invention provides a saddle-ride type four-wheeled vehicle capable of increasing a tank capacity of the fuel tank and reducing a moment acting on the fixing position at which the fuel pump is fixed.

According to a preferred embodiment of the present invention, a saddle-ride type four-wheeled vehicle includes an engine including a crankcase, a cylinder arranged above the crankcase, and a head cover provided on a top of the cylinder, the engine being situated between front and rear wheels. Further, the saddle-ride type four-wheeled vehicle includes a fuel tank located above the head cover, and a fuel pump disposed in the fuel tank. A lower surface portion of the fuel tank includes, at a more forward position than the head cover, a deep bottom portion situated at a lowest position in the lower surface portion, and an upper surface portion of the fuel tank includes, at a more rearward position than the deep bottom portion, an inclined portion arranged to extend rearward and obliquely downward. An upper end of the fuel pump is fixed to the inclined portion, and the fuel pump is arranged to extend from the inclined portion toward the deep bottom portion forward and obliquely downward.

In a preferred embodiment of the present invention, the fuel pump is fixed to the portion that is inclined, and arranged to extend forward and obliquely downward. Therefore, in comparison with a case where the fuel pump is arranged in the vertical direction, it is possible to reduce a moment which is generated at the fixing position of the fuel pump due to the force in the front-rear direction acting on the fuel pump. Further, the deep bottom portion of the fuel tank is situated further forward than the head cover, and hence it is possible to lower a position of the deep bottom portion, and to increase a capacity of the fuel tank.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
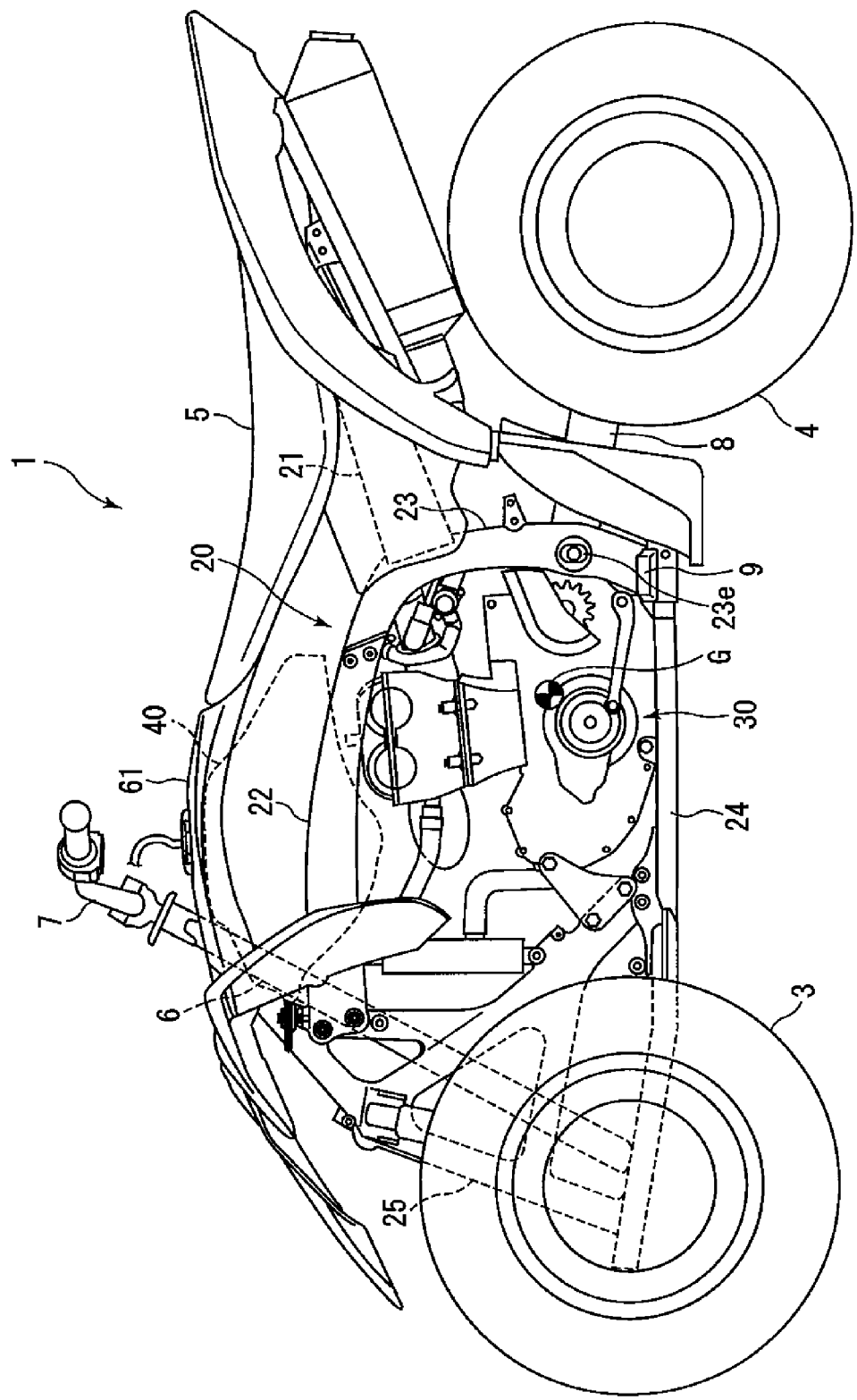
FIG. 1 is a side view of a saddle-ride type four-wheeled vehicle according to a preferred embodiment of the present invention.
Figure 2:
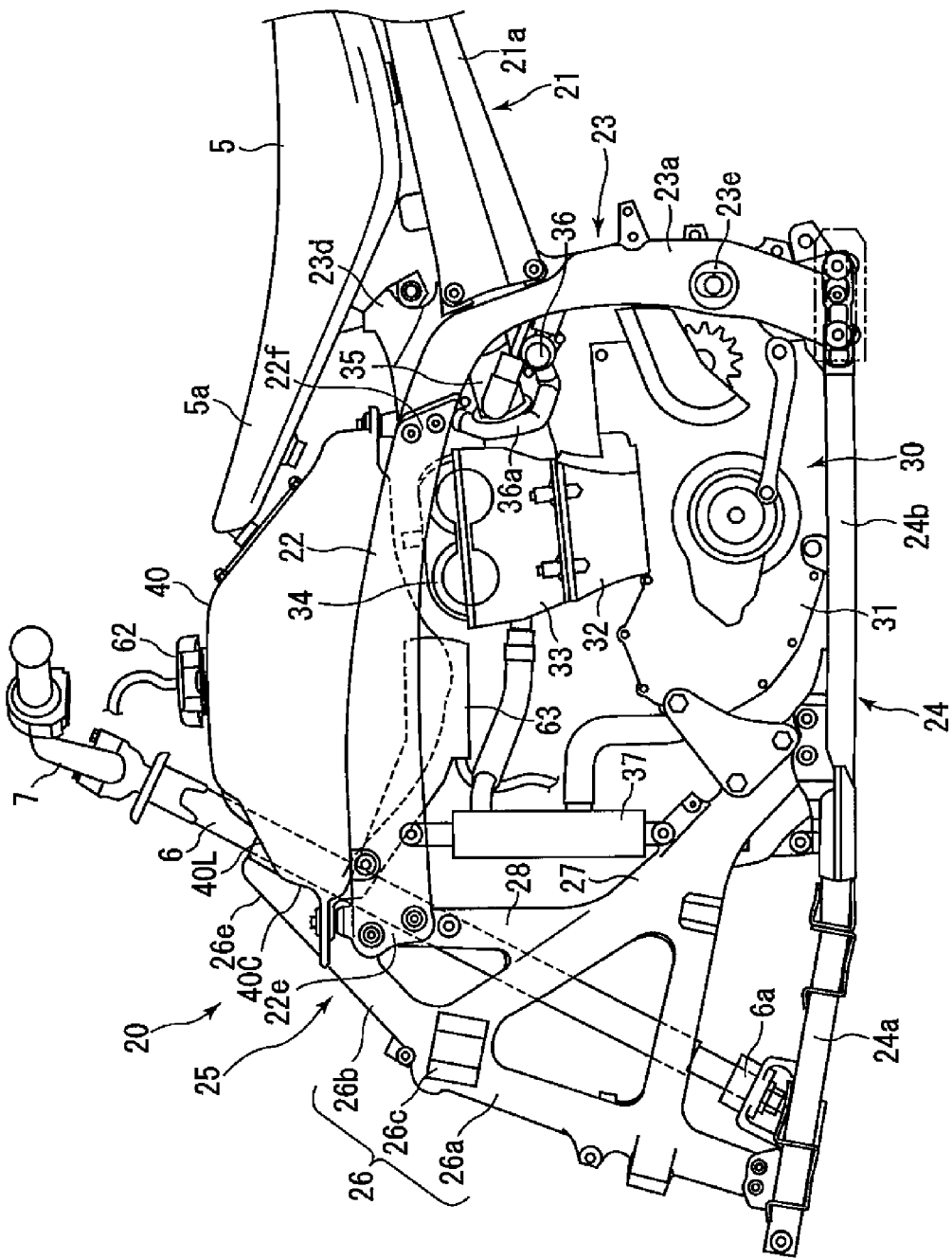
FIG. 2 is a side view of a fuel tank, an engine, and a seat of the saddle-ride type four-wheeled vehicle.
Figure 3:
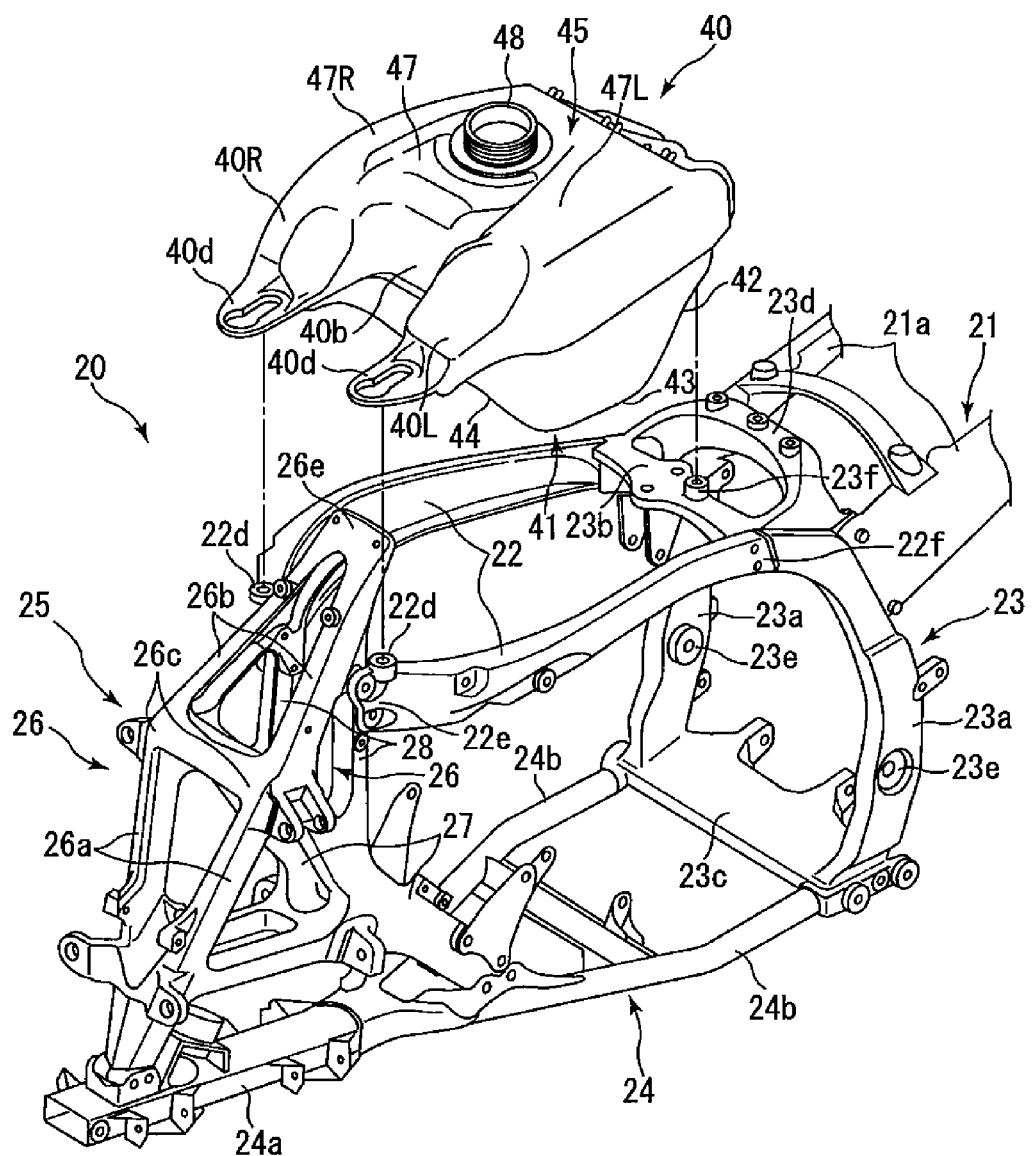
FIG. 3 is a perspective view of a body frame and the fuel tank of the saddle-ride type four-wheeled vehicle.
Figure 4:
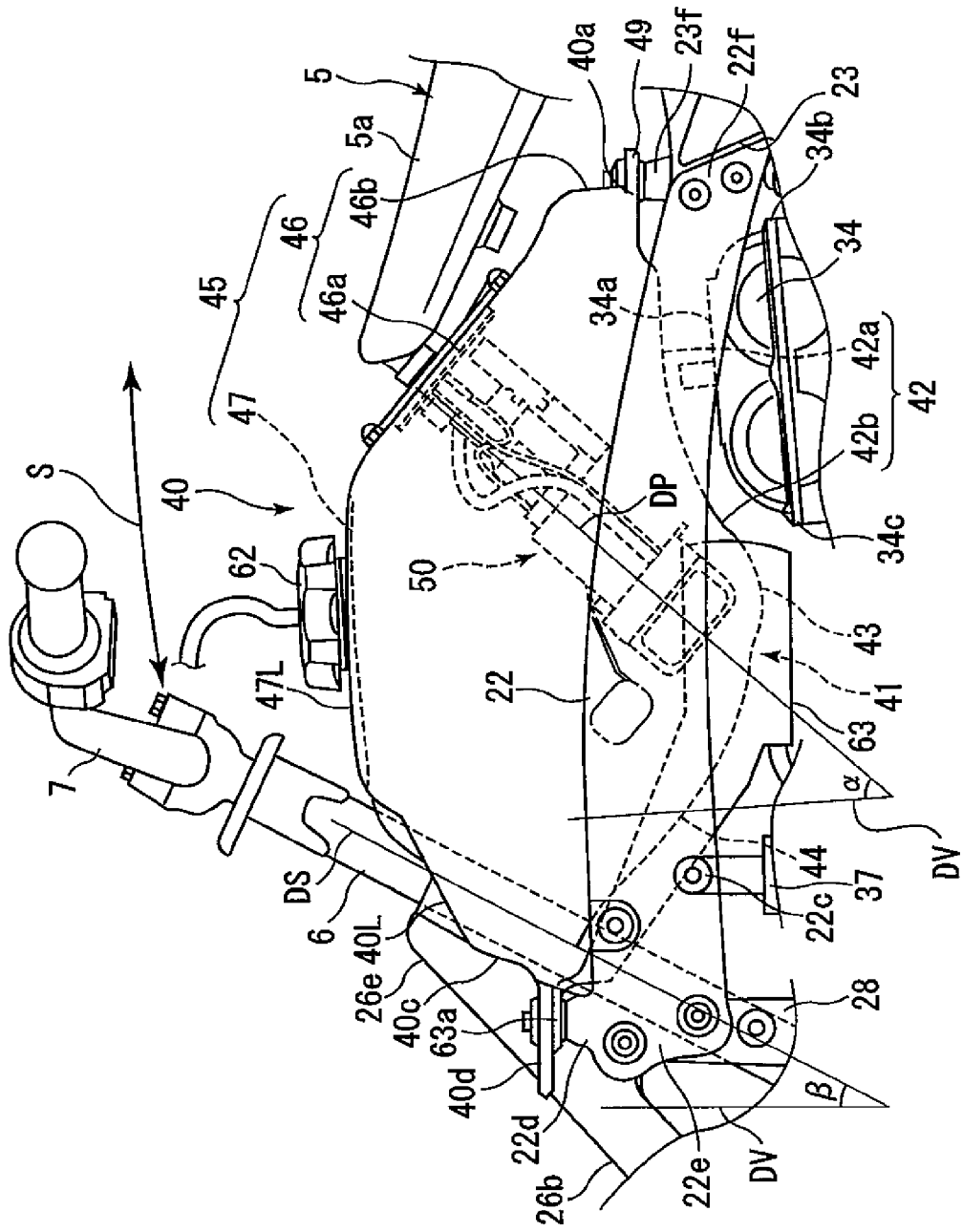
FIG. 4 is an enlarged view of the fuel tank illustrated in FIG. 2.
Figure 5:
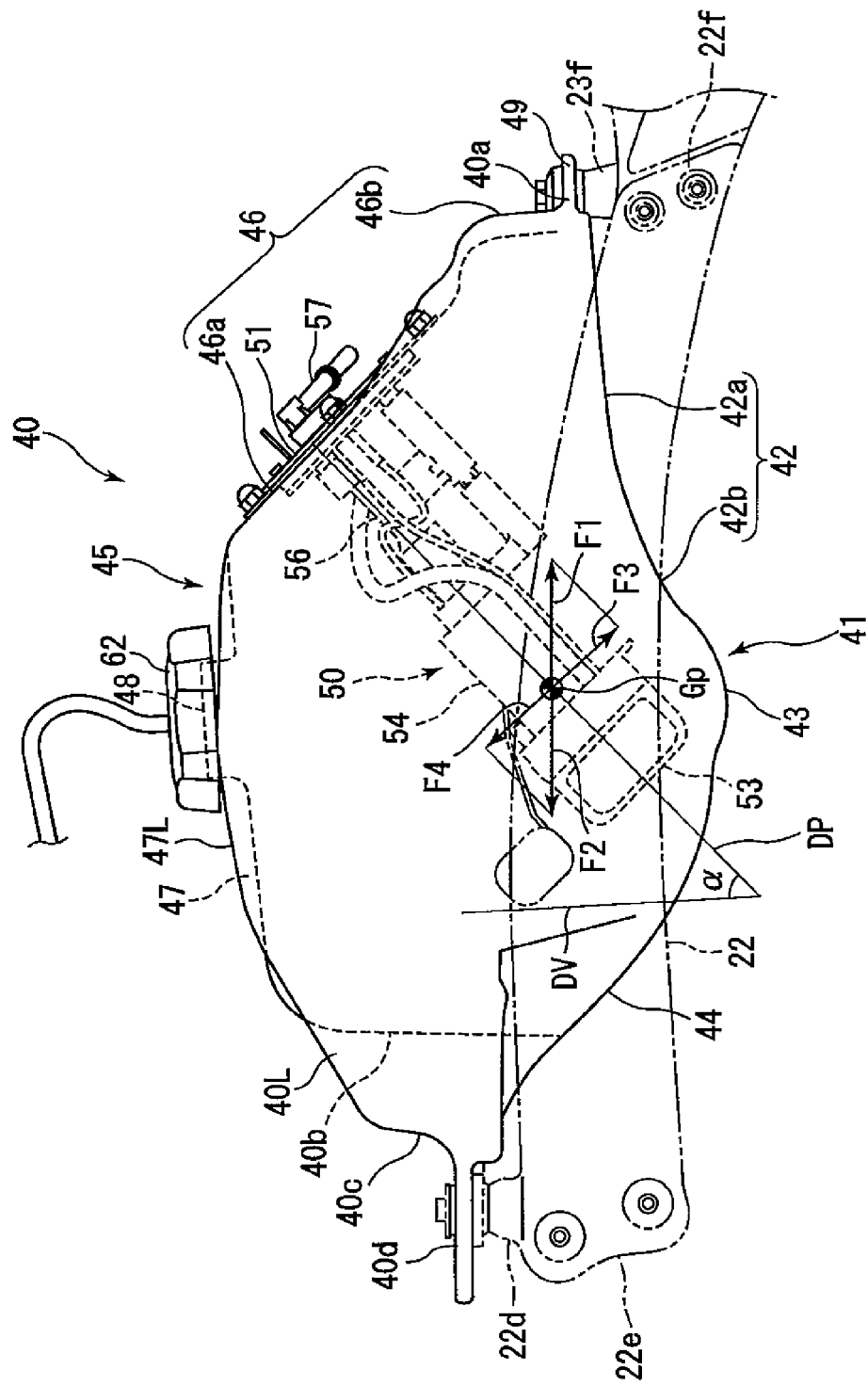
FIG. 5 is a side view of the fuel tank.
Figure 6:
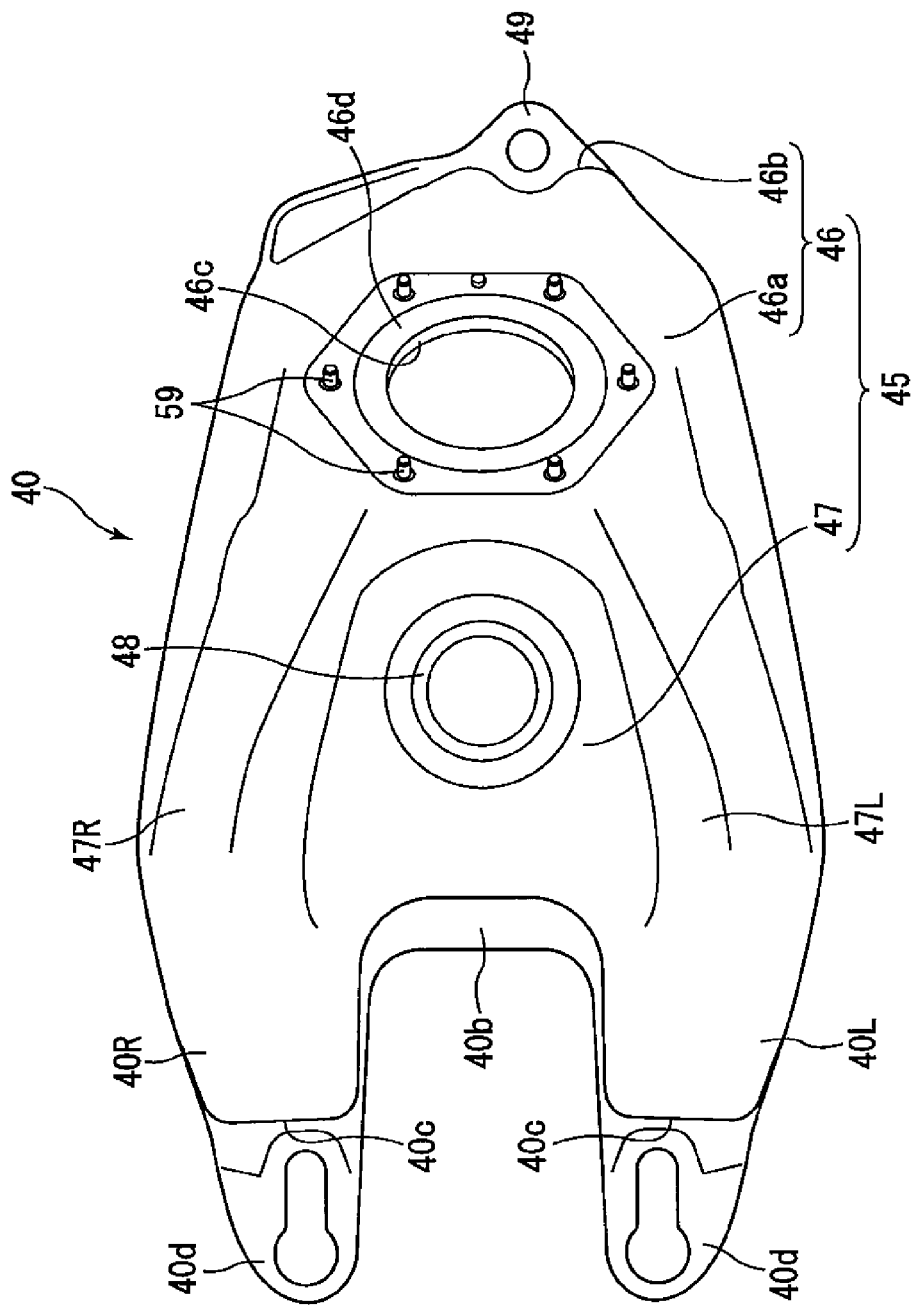
FIG. 6 is a plane view of the fuel tank, which illustrates a state in which a cap closing a filling opening of the fuel tank, and a fuel pump disposed in the fuel tank, are omitted.

In the following, preferred embodiments of the present invention are described with reference to the drawings. FIG. 1 is a side view of a saddle-ride type four-wheeled vehicle 1 according to a preferred embodiment of the present invention. FIG. 2 is a side view of a fuel tank 40, an engine 30, and a seat 5. FIG. 3 is a perspective view of a body frame 20 and the fuel tank 40. FIG. 4 is an enlarged view of the fuel tank 40 illustrated in FIG. 2. FIG. 5 is a side view of the fuel tank 40. FIG. 6 is a plane view of the fuel tank 40. FIG. 6 illustrates the fuel tank 40 in which a cap 62 for closing a filling opening 48 of the fuel tank 40, and a fuel pump 50 disposed in the fuel tank 40 are omitted.

The saddle-ride type four-wheeled vehicle 1 preferably is an all-terrain vehicle. As illustrated in FIG. 1, the saddle-ride type four-wheeled vehicle 1 includes right and left front wheels 3, right and left rear wheels 4, the body frame 20 supporting the front wheels 3 and the rear wheels 4, the seat 5, the engine 30, and the fuel tank 40. Further, the body frame 20 includes a seat frame 21, tank frames 22, a rear frame 23, a lower frame 24, and a front frame 25.

As illustrated in FIG. 2, the engine 30 includes a crankcase 31 in the lower portion thereof. Further, the engine 30 includes a cylinder block 32 in which a cylinder is provided, a cylinder head 33, and a head cover 34 located on the tops of the cylinder block 32 and the cylinder head 33. The cylinder block 32 is located on the crankcase 31, and the cylinder head 33 is located on the cylinder block 32. The head cover 34 covers the cylinder head 33 from above. The cylinder block 32 and the cylinder head 33 are arranged so as to be inclined slightly forward with respect to a vertical direction. As illustrated in FIG. 1, the engine 30 is situated between the front wheels 3 and the rear wheels 4, that is, substantially at the center portion of the vehicle, and a center of gravity G of the vehicle is situated in the crankcase 31 which is situated on the lower portion of the engine 30.

As illustrated in FIG. 2, a throttle body 35 is located at a rear side of the cylinder head 33. A throttle valve for opening and closing in accordance with throttle operation performed by a rider is disposed inside the throttle body 35. Further, a fuel supply device 36 arranged to supply fuel to air flowing in the throttle body 35 is fixed to the throttle body 35. In this preferred embodiment, the fuel supply device 36 preferably is an injector that injects the fuel, for example. While the engine 30 is driven, the fuel is supplied to the fuel supply device 36 from the fuel pump 50 (FIG. 4) disposed in the fuel tank 40 through a hose 36a.

The lower frame 24 is located below the engine 30, and supports the engine 30 from below. As illustrated in FIG. 3, the lower frame 24 includes a front extending portion 24a situated at the center in a vehicle width direction and extending in a front-rear direction. Also, the lower frame 24 includes rear extending portions 24b, 24b extending rearward from the front extending portion 24a to right and left, respectively.

As illustrated in FIG. 2 or 3, the front frame 25 is located at a front side of the engine 30. The front frame 25 includes right and left front pillars 26 in the front portion of the front frame 25. The front pillars 26 extend upward from the lower ends of the front pillars 26, and are inclined rearward. Middle portions 26c of the right and left front pillars 26 are spaced at a distance from each other in the vehicle width direction. Each of the front pillars 26 includes a lower pillar 26a extending obliquely downward from the middle portion 26c. The right and left lower pillars 26a are inclined so that a distance between them decreases as the lower pillars 26a extend downward. The lower ends of the lower pillars 26a, 26a are integrated with each other, and connected to the front extending portion 24a of the lower frame 24. Further, each of the front pillars 26 includes an upper pillar 26b extending obliquely upward from the middle portion 26c. The upper pillars 26b are inclined toward the center in the vehicle width direction, and a distance between the right and left upper pillars 26b is decreased as the upper pillars 26b extend upward.

As illustrated in FIG. 2 or 3, the upper ends of the right and left upper pillars 26b are coupled and integrated with each other. Further, the integrated upper ends of the upper pillars 26b define a steering-supporting portion 26e arranged to support a steering stem 6. A lower end 6a of the steering stem 6 is supported by the front extending portion 24a of the lower frame 24. The steering stem 6 extends upward from the lower end 6a and is inclined rearward, and the upper portion of the steering stem 6 is situated behind the steering-supporting portion 26e. The steering stem 6 is fixed to the steering-supporting portion 26e by a holder (not shown), and is rotatably supported by the steering-supporting portion 26e. A handlebar 7 extending in right and left directions is fixed on the upper end of the steering stem 6.

As illustrated in FIG. 2 or 3, the front frame 25 includes right and left rear pillars 27 and right and left reinforcing pillars 28 which are situated at the rear side of the front pillars 26. The upper ends of the rear pillars 27 are connected to the middle portions 26c, respectively. The rear pillars 27 extend from the middle portions 26c rearward and obliquely downward, and the lower ends (rear ends) of the rear pillars 27 are connected to the rear extending portions 24b of the lower frame 24, respectively.

The reinforcing pillars 28 are bridged between the rear pillars 27 and the upper pillars 26b. Connecting positions between the reinforcing pillars 28 and the upper pillars 26b are positioned slightly lower than the steering-supporting portion 26e. The reinforcing pillars 28 extend from the connecting positions with the upper pillars 26b substantially in the vertical direction.

The front wheels 3 are located on right and left sides of the front frame 25 and the front extending portion 24a. The front wheels 3 are supported by the front frame 25 and the front extending portion 24a via arms (not shown) extending from the front frame 25 and the front extending portion 24a to outer sides in the vehicle width direction. The front wheels 3 can move up and down with respect to the front frame 25 and the front extending portion 24a. The front wheels 3 are connected to the lower portion of the steering stem 6 via a tie rod (not shown), and the front wheels 3 can be steered by operation of the handlebar 7.

The right and left tank frames 22 extend in the front-rear direction, and are spaced at a distance from each other in the vehicle width direction (see FIG. 3). As illustrated in FIG. 4, front ends 22e of the tank frames 22 are situated on the outsides in the vehicle width direction with respect to the reinforcing pillars 28, and are fixed to the side surfaces of the reinforcing pillars 28, respectively. The tank frames 22 extend rearward from the front ends 22e, and are situated above the engine 30 (see FIG. 2). Rear ends 22f of the tank frames 22 are fixed to the rear frame 23. Further, the front portions of the tank frames 22 are curved so as to swell to the outer sides in the vehicle width direction (see FIG. 3).

As illustrated in FIG. 2 or 3, the rear frame 23 includes a pair of right and left longitudinal frame portions 23a extending in the vertical direction, and an upper crossbar 23b bridging between the right and left longitudinal frame portions 23a. The rear ends of the rear extending portions 24b are connected to the lower ends of the longitudinal frame portions 23a, respectively. Further, footrests 9, on which a rider puts their feet, are attached to the rear ends of the rear extending portions 24b from the outside in the vehicle width direction, respectively. The footrests 9 are situated posterior to the lower portion of the crankcase 31 when viewed from the side of the vehicle (see FIG. 1). The longitudinal frame portions 23a extend upward from the lower ends thereof, and the upper portions thereof are bent forward. Further, the rear ends 22f of the tank frames 22 are fixed to the upper ends (front ends) of the longitudinal frame portions 23a (see FIG. 4). As illustrated in FIG. 3, the upper crossbar 23b bridges between the front ends of the longitudinal frame portions 23a. In this regard, in addition to the upper crossbar 23b, the rear frame 23 includes a lower crossbar 23c and a rear crossbar 23d. The rear crossbar 23d is situated posterior to the upper crossbar 23b, and bridges between the right and left longitudinal frame portions 23a. The lower crossbar 23c bridges between the lower ends of the right and left longitudinal frame portions 23a.

A rear arm 8 is arranged posterior to the rear frame 23 (see FIG. 1). As illustrated in FIG. 3, supporting portions 23e arranged to support a pivot (not shown) are provided in the lower portions of the longitudinal frame portions 23a, respectively. The front end of the rear arm 8 is coupled to the supporting portions 23e via the pivot, and the rear end of the rear arm 8 is coupled to a wheel axis (not shown) of the right and left rear wheels 4. The rear frame 23 supports the right and left rear wheels 4 through the intermediate arrangement of the rear arm 8 and the wheel shaft. The rear arm 8 can move up and down together with the rear wheels 4 while using the pivot as a fulcrum.

As illustrated in FIG. 2 or 3, the seat frame 21 includes a pair of right and left extending portions 21a. The front ends of the extending portions 21a are fixed to the upper portions of the longitudinal frame portions 23a, respectively. The extending portions 21a extend rearward from the front ends thereof, and are inclined slightly upward. The seat 5 is located above the extending portions 21a, and the seat frame 21 supports the seat 5.

The fuel tank 40 will be described in detail. As illustrated in FIG. 2, the fuel tank 40 is situated between the front wheels 3 and the rear wheels 4 when viewed from the side of the vehicle. Further, the fuel tank 40 is situated above the head cover 34, and situated between the right and left tank frames 22. In this example, the rear portion of the fuel tank 40 is preferably situated over the head cover 34. Further, the fuel tank 40 is arranged anterior to the seat 5, and the rear portion of the fuel tank 40 is situated under a front portion 5a of the seat 5. The fuel tank 40 is covered, from above and the sides, with a tank cover 61 arranged anterior to the seat 5 (see FIG. 1).

As illustrated in FIG. 3 or 4, the fuel tank 40 includes a lower surface portion 41 defining the lower surface of the fuel tank 40, and an upper surface portion 45 defining the upper surface of the fuel tank 40. The lower surface portion 41 preferably has a substantially bowl-like shape opening upward, and defines a bottom portion of the fuel tank 40. The upper surface portion 45 preferably has a substantially bowl-like shape opening downward, and is arranged so as to cover the lower surface portion 41 from above. The fuel tank 40, which includes the upper surface portion 45 and the lower surface portion 41, preferably is integrally formed of a resin. The fuel pump 50 which sucks the fuel in the fuel tank 40 to supply the sucked fuel to the fuel supply device 36 is disposed inside the fuel tank 40.

As illustrated in FIG. 4, the lower surface portion 41 of the fuel tank 40 has, in the rear portion thereof, a lower inclined portion 42 which is arranged to extend rearward and obliquely upward. The head cover 34 and the cylinder head 33 of the engine 30 are situated under the lower inclined portion 42. Further, the lower inclined portion 42 is arranged along an upper surface 34a of the head cover 34, and covers the head cover 34 from above. Specifically, a rear portion 42a of the lower inclined portion 42 is preferably flat and arranged substantially parallel to the upper surface 34a of the head cover 34. A front portion 42b of the lower inclined portion 42 is curved downward along the front surface of the head cover 34.

A rear end 40a of the fuel tank 40 is situated above a rear edge 34b of the head cover 34. The lower inclined portion 42 extends from the rear end 40a up to a position above a front edge 34c of the head cover 34. In this regard, a fixed portion 49 protruding rearward is located at the rear end 40a of the fuel tank 40. The fixed portion 49 is fixed to a tank-supporting portion 23f provided on the upper crossbar 23b (see FIG. 3).

The lower surface portion 41 includes a deep bottom portion 43 anterior to the lower inclined portion 42. The lower surface portion 41 is deepest at the deep bottom portion 43. That is, the deep bottom portion 43 is situated at the lowest position in the lower surface portion 41. The deep bottom portion 43 is situated in front of the head cover 34, and is situated lower than the upper surface 34a of the head cover 34.

The engine 30 preferably is a water-cooled engine, and a radiator 37 arranged to radiate heat of coolant is spaced away from the engine 30 in the forward direction (see FIG. 2). The radiator 37 preferably has a box-like shape elongated in the vertical direction. The deep bottom portion 43 is situated posterior to the radiator 37. As illustrated in FIG. 4, radiator-fixing portions 22c to which the upper ends of the radiator 37 are fixed are provided in the tank frames 22. The deep bottom portion 43 is situated lower than the radiator-fixing portions 22c. As described above, the deep bottom portion 43 is situated between the radiator 37 and the cylinder head 33.

The lower surface portion 41 includes a front inclined portion 44 which is arranged to extend from the deep bottom portion 43 forward and upward. The front inclined portion 44 is situated over the radiator 37.

As illustrated in FIG. 3 or 6, a recess 40b recessed rearward is provided in the front surface of the fuel tank 40, and the recess 40b is situated at the center in the vehicle width direction. The fuel tank 40 includes, at the front portion thereof, a right front portion 40R and a left front portion 40L which are situated at a distance from each other in the vehicle width direction and a space therebetween forms a recess 40b. As described above, the steering stem 6 extends upward from the lower end 6a, and is inclined rearward (see FIG. 2). The steering stem 6 is situated in front of the fuel tank 40, and extends upward through the recess 40b. That is, the right front portion 40R and the left front portion 40L are situated on the right and left sides of the steering stem 6, respectively.

Further, as described above, the front frame 25 includes, at the upper portion thereof, the right and left upper pillar portions (extending portions in claims) 26b. The upper ends of the right and left upper pillars 26b are unified with each other (see FIG. 3). Therefore, in comparison with a case where the upper ends of the right and left upper pillars 26b are situated at a distance from each other in the vehicle width direction, it becomes easier to elongate the right front portion 40R and the left front portion 40L forward. In this example, as illustrated in FIG. 4, front surfaces 40c of the right front portion 40R and the left front portion 40L are situated further forward than the rear surface of the steering-supporting portion 26e which the upper ends of the right and left upper pillars 26b define. In this regard, the handlebar 7, which is provided at the upper end of the steering stem 6, is situated above the fuel tank 40.

Fixed portions 40d are provided at the front ends of the right front portion 40R and the left front portion 40L, respectively (see FIG. 6). As illustrated in FIG. 4, the fixed portions 40d protrude forward from the right front portion 40R and the left front portion 40L, and are disposed on the tank frames 22. The fixed portions 40d are fixed to tank-supporting portions 22d provided on the upper surfaces of the tank frames 22. The steering-supporting portion 26e, which is constituted by the upper ends of the right and left upper pillars 26b, is situated between the right and left fixed portions 40d, 40d.

A receiving member 63 arranged to receive fuel overflowing from the filling opening 48 and to discharge the fuel to the lower side of the vehicle is located under the fuel tank 40. Fixed portions 63a located at the front ends of the receiving member 63 are fixed to the tank-supporting portions 22d together with the fixed portions 40d.

As illustrated in FIG. 4, the upper surface portion 45 includes, at the rear portion thereof, an upper inclined portion 46 which is arranged to extend rearward and obliquely downward. The upper inclined portion 46 is situated under the front portion 5a of the seat 5. The upper inclined portion 46 is arranged to extend obliquely from the rear end 40a of the fuel tank 40 along the lower surface of the front portion 5a of the seat 5. The upper inclined portion 46 and the lower inclined portion 42 exhibit a substantially triangular shape when viewed from the side of the fuel tank 40. Further, the front portion 5a of the seat 5 is situated over the upper inclined portion 46 and the lower inclined portion 42, and the head cover 34 is situated under the upper inclined portion 46 and the lower inclined portion 42.

As illustrated in FIG. 5, the upper inclined portion 46 has a rear wall portion 46b extending upright from the rear end 40a of the fuel tank 40 substantially in the vertical direction. Further, the upper inclined portion 46 has a pump-fixing surface portion 46a extending from the rear wall portion 46b obliquely upward and forward. In other words, the pump-fixing surface portion 46a is arranged to extend from a front upper surface portion 47 up to the rear wall portion 46b rearward and obliquely downward, the front upper surface portion 47 being situated at the front portion of the upper surface portion 45 and arranged to be substantially horizontal. The pump-fixing surface portion 46a is situated further rearward than the deep bottom portion 43. Further, the front end of the pump-fixing surface portion 46a is situated in front of the front end (upper end) of the seat 5. The pump-fixing surface portion 46a preferably is substantially flat. In this regard, as described above, the fuel tank 40 is covered with the tank cover 61 from above (see FIG. 1). The rear portion of the tank cover 61, which is situated between the pump-fixing surface portion 46a and the lower surface of the seat 5, protects the pump-fixing surface portion 46a and supports the front portion 5a of the seat 5.

The upper end of the fuel pump 50 is fixed to the pump-fixing surface portion 46a, and the fuel pump 50 is arranged obliquely in the fuel tank 40. Specifically, the fuel pump 50 is arranged to extend forward and obliquely downward from the pump-fixing surface portion 46a toward the deep bottom portion 43 situated further forward than the pump-fixing surface portion 46a. In other words, the fuel pump 50 is arranged obliquely such that the upper portion of the fuel pump 50 is situated further rearward than the lower portion thereof.

The pump-fixing surface portion 46a is situated above the head cover 34. Further, as described above, the deep bottom portion 43 is situated in front of the head cover 34. Therefore, the upper end of the fuel pump 50 is situated above the head cover 34, whereas the lower end of the fuel pump 50 is situated further forward than the head cover 34. Thus, the fuel pump 50 is arranged obliquely above the head cover 34. With this configuration, it is possible to reduce a height of the rear portion of the fuel tank 40. As a result, it is possible to elongate the seat 5 forward while preventing the position of the front portion 5a of the seat 5 from being raised.

Figure 7:
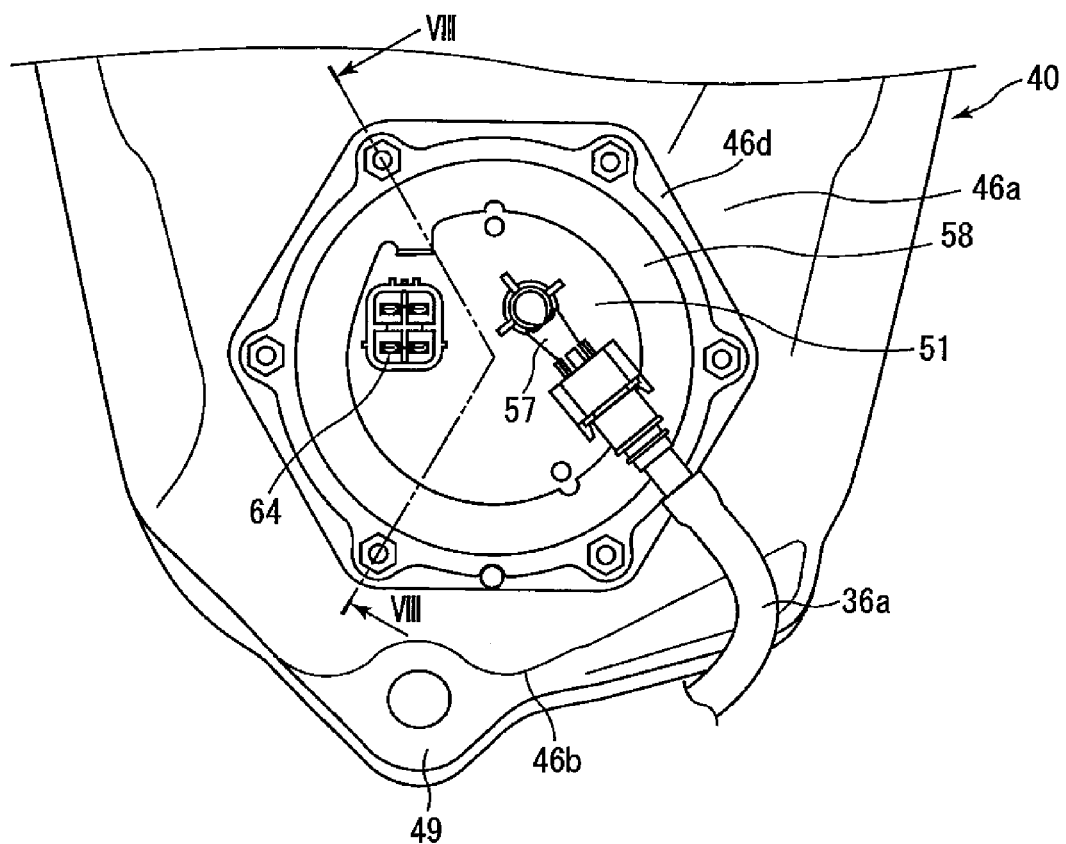
FIG. 7 is a plane view illustrating a fixing position of the fuel pump in the fuel tank.
Figure 8:
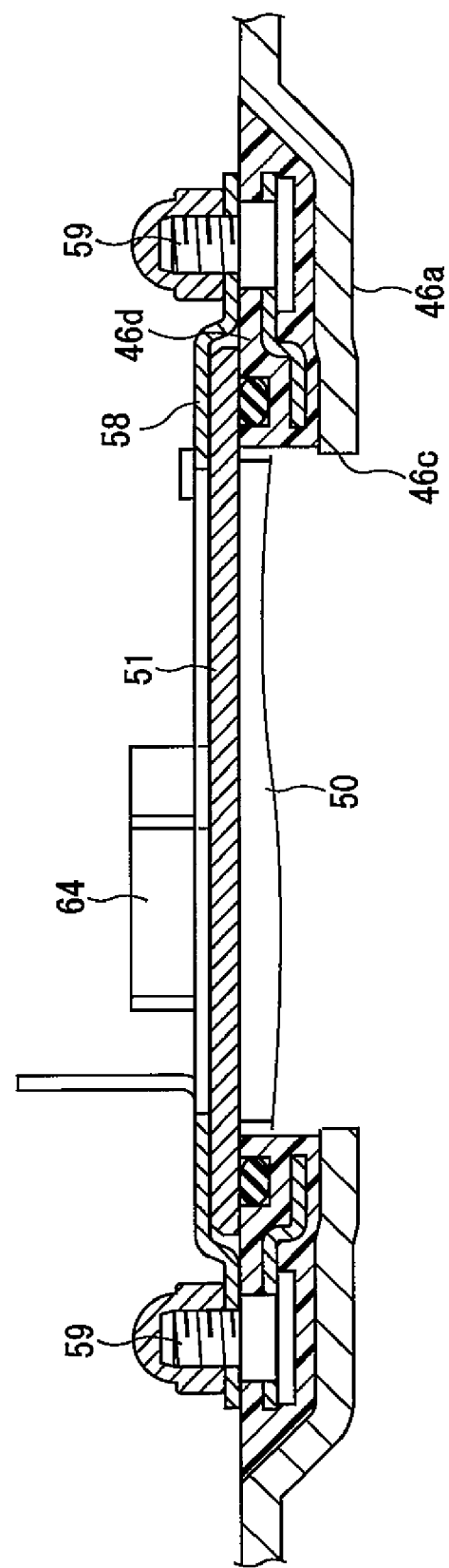
FIG. 8 is a sectional view taken along the line VIII-VIII of FIG. 7.

FIG. 7 is a plane view illustrating a fixing position of the fuel pump 50 in the fuel tank 40. FIG. 8 is a sectional view taken along the line VIII-VIII of FIG. 7. As illustrated in FIGS. 6 to 8, an opening 46c is formed in the pump-fixing surface portion 46a, and a plurality of bolts 59 aligned circumferentially are provided at the edge of the opening 46c. Specifically, an annular fixing portion 46d, which is preferably made of a resin, is fixed to the edge of the opening 46c, and the bolts 59 are insert-molded onto the fixing portion 46d. The fuel pump 50 has, at the upper end thereof, a disk-like fixing plate 51 which is larger in size than the opening 46c. The outer peripheral edge of the fixing plate 51 is situated on the edge of the fixing portion 46d, and is fixed onto the fixing portion 46d. In this example, an annular bracket 58 is disposed on the fixing plate 51. The bracket 58 is fixed by the bolts 59 onto the fixing portion 46d. The fixing plate 51 is sandwiched between the bracket 58 and the fixing portion 46d, to thereby be fixed onto the fixing portion 46d.

The fixing plate 51 is arranged substantially perpendicularly with respect to a length direction (direction indicated by line DP of FIG. 5) of the fuel pump 50. Therefore, by fixing the fixing plate 51 to the pump-fixing surface portion 46a, the fuel pump 50 extends substantially in the perpendicular direction with respect to the pump-fixing surface portion 46a, and is arranged obliquely in the fuel tank 40.

As illustrated in FIG. 5, the fuel pump 50 includes a filter 53 arranged to absorb the fuel in the fuel tank 40 and to purify the absorbed fuel, a pump motor 54, and a fuel pipe 56 arranged to feed the fuel from the pump motor 54 to a discharge port 57 provided in the fixing plate 51. Further, as illustrated in FIG. 7, a terminal 64, which connects with an electric wire to supply electric power and signals to the fuel pump 50, is provided on the fixing plate 51.

As illustrated in FIG. 5, the filter 53, which is situated at the lower end of the fuel pump 50, is disposed in the deep bottom portion 43, and situated at the center portion in the front-rear direction of the fuel tank 40. Specifically, a clearance is provided between the filter 53 and the deep bottom portion 43, and the filter 53 is disposed above the deep bottom portion 43. The pump motor 54 is arranged obliquely above the filter 53, and the fuel pipe 56 extends from the pump motor 54 obliquely upward. As described above, the fuel pump 50 extends upward from the filter 53, and is inclined rearward. That is, the fuel pump 50 is arranged obliquely such that the fixing plate 51 is situated further rearward than the filter 53. Further, an axis direction of the fuel pump 50 (direction indicated by line DP of FIG. 5) is oblique with respect to the vertical direction (direction indicated by line DV of FIG. 5).

As described above, the steering stem 6 is inclined rearward. An inclination angle α (angle formed by an axis direction DP of the fuel pump 50 and the vertical direction DP) of the fuel pump 50 is larger than an inclination angle β (angle formed by an extending direction (direction indicated by line DS of FIG. 4) of the steering stem 6 and the vertical direction (direction indicated by line DV of FIG. 4)).

As illustrated in FIG. 3 or 5, the upper surface portion 45 has, at the front portion thereof, the above-mentioned front upper surface portion 47. The filling opening 48 is formed in the front upper surface portion 47. The filling opening 48 preferably has a cylindrical or substantially cylindrical shape protruding upward, and is situated at the center portion of the front upper surface portion 47. The filter 53 is situated under the filling opening 48. The front upper surface portion 47 is flat, and is arranged to extend forward from the upper inclined portion 46. The steering stem 6 is situated anterior to the front upper surface portion 47, and the filling opening 48 is situated between the pump-fixing surface portion 46a and the steering stem 6. Further, the handlebar 7 is situated above the filling opening 48 (see FIG. 4). The front upper surface portion 47 extends forward and is inclined slightly downward. With this configuration, a space between the filling opening 48 and the handlebar 7 becomes large. In this regard, the front upper surface portion 47 is situated at the center in the vehicle width direction in the upper surface portion 45, and the upper surface portion 45 includes, on the right and left sides of the front upper surface portion 47, a right upper surface portion 47R and a left upper surface portion 47L which are situated higher than the front upper surface portion 47 (see FIG. 3 or 6).

As described above, in the saddle-ride type four-wheeled vehicle 1, the lower surface portion 41 of the fuel tank 40 includes the deep bottom portion 43 situated further forward than the head cover 34 and at the lowest position in the lower surface portion 41. Further, the upper surface portion 45 of the fuel tank 40 includes the upper inclined portion 46 which is situated further rearward than the deep bottom portion 43 and is arranged to extend rearward and obliquely downward. Further, the upper end of the fuel pump 50 (fixing plate 51 in this example) is fixed to the upper inclined portion 46 (pump-fixing surface portion 46a in this example), and the fuel pump 50 is arranged to extend from the upper inclined portion 46 toward the deep bottom portion 43 forward and obliquely downward.

As described above, in the saddle-ride type four-wheeled vehicle 1, the deep bottom portion 43 of the fuel tank 40 is situated further forward than the head cover 34, and hence it is possible to lower the position of the deep bottom portion 43, and to increase a capacity of the fuel tank 40. Further, the fuel pump 50 is arranged to extend forward and obliquely downward. Therefore, in comparison with a case where the fuel pump 50 is arranged in the vertical direction, it is possible to reduce moment generated at the fixing position of the fuel pump 50 (that is, pump-fixing surface portion 46a) due to pitch motion of the vehicle.

Specifically, in a case where the vehicle experiences a rotational pitch motion around the engine, for example, a case where the saddle-ride type four-wheeled vehicle 1 climbs over large obstacles, the fuel tank 40 sways in the front-rear direction (direction indicated by arrow S of FIG. 4) around the engine 30 situated at the center portion of pitch motion. As a result, a force (force indicated by arrow F1-F2 of FIG. 5) in the front-rear direction acts on the fuel pump 50. Further, the moment is generated in the pump-fixing surface portion 46a, and a load (force to deform the pump-fixing surface portion 46a) is applied to the pump-fixing surface portion 46a. In particular, in a fuel pump, such as the fuel pump 50, in which the pump motor 54 having a large weight is provided in the lower portion thereof, a center of gravity Gp of the fuel pump 50 is situated in the lower portion of the fuel pump 50. Therefore, the moment generated in the pump-fixing surface portion 46a tends to increase. In the saddle-ride type four-wheeled vehicle 1, the fuel pump 50 is arranged obliquely, and hence a force (force indicated by arrow F3-F4 of FIG. 5) having components that are perpendicular or substantially perpendicular to the extending direction DP of the fuel pump 50 becomes smaller in comparison with a case where the fuel pump 50 is arranged to extend in the vertical direction. As a result, the moment generated in the pump-fixing surface portion 46a is reduced.

Further, in the saddle-ride type four-wheeled vehicle 1, the deep bottom portion 43 is situated lower than the upper surface 34a of the head cover 34. With this configuration, it is possible to further increase the capacity of the fuel tank 40.

Further, the front portion 5a of the seat 5 is situated over the upper inclined portion 46. With this configuration, it is possible to elongate the seat 5 forward. Further, the fuel pump 50 is arranged obliquely, and hence it is possible to prevent an increase in height of the position of the front portion 5a of the seat 5.

Further, the fuel pump 50 is situated above the head cover 34. With this configuration, in comparison with a case where the entire fuel pump 50 is situated further forward or rearward than the head cover 34, the size in the front-rear direction of the fuel tank 40 can be reduced.

Further, the right and left upper pillars 26b of the front frame 25 are inclined so that a distance between them decreases as the upper pillars 26b extend upward. The upper ends of the upper pillars 26b are coupled to each other to define the steering-supporting portion 26e supporting the steering stem 6. Further, the fuel tank 40 includes the right front portion 40R and the left front portion 40L which are situated on the right and left sides of the steering stem 6, respectively. With this configuration, in comparison with a case where the upper ends of the right and left upper pillars 26b are situated at a distance from each other in the vehicle width direction, it becomes easier to elongate the right front portion 40R and the left front portion 40L forward.

Further, the fuel pump 50 is arranged obliquely, and hence it becomes easy to maintain a state in which the fuel pump 50 is submerged in the fuel. Further, in comparison with a case where the fuel pump 50 is arranged so as to be suspended in the vertical direction, it is possible to reduce the height of the fuel tank 40.

Further, the fuel pump 50 is fixed to the upper inclined portion 46 arranged to extend rearward and obliquely downward. With this configuration, the fuel pump 50 is fixed to extend substantially in the perpendicular direction with respect to the upper inclined portion 46, and thus the fuel pump 50 can be arranged obliquely. As a result, it is possible to simplify the fixing structure for the fuel pump 50.

Further, the lower surface portion 41 of the fuel tank 40 has, at the rear portion thereof, the lower inclined portion 42 extending rearward and obliquely upward, and the engine 30 is situated under the lower inclined portion 42. With this configuration, without lowering the position of the engine 30, it is possible to lower the position of the fuel tank 40.

Further, in the saddle-ride type four-wheeled vehicle 1, the radiator 37 is spaced away from the engine 30 in the forward direction. Further, the deep bottom portion 43 is situated behind the radiator 37 and in front of the engine 30. With this configuration, without lowering the positions of the radiator 37 and the engine 30, it is possible to increase the capacity of the fuel tank 40.

Further, the fuel pump 50 has, at the lower end thereof, the filter 53 arranged to absorb the fuel in the fuel tank 40, and the filter 53 is disposed in the deep bottom portion 43. With this configuration, it is possible to suck the fuel gathered in the deep bottom portion 43.

Further, the steering stem 6 is situated in front of the fuel tank 40, and extends upward from the position lower than the fuel tank 40 so as to be inclined rearward. Meanwhile, the fuel pump 50 extends upward from the lower end thereof toward the upper inclined portion 46, and is inclined rearward at the angle α larger than the inclination angle β of the steering stem 6. Further, the filling opening 48 of the fuel tank 40 is provided between the steering stem 6 and the upper inclined portion 46. As described above, by inclining the fuel pump 50 rearward at the angle α larger than the inclination angle β of the steering stem 6, it is possible to secure a large distance between the steering stem 6 and the upper inclined portion 46. As a result, it is possible to secure a large space around the filling opening 48, and to improve workability of supplying the fuel.

Further, the front upper surface portion 47, in which the filling opening 48 is formed, is arranged to extend from the upper inclined portion 46 forward and obliquely downward. With this configuration, it is possible to increase the space above the filling opening 48.

Note that the present invention is not limited to the above-mentioned saddle-ride type four-wheeled vehicle 1, and various modifications are possible. For example, in the saddle-ride type four-wheeled vehicle 1, the fuel pump 50 is preferably arranged obliquely to extend forward and obliquely downward from the upper end thereof. However, the fuel pump 50 may be inclined in the vehicle width direction. For example, the fixing plate 51 may be situated at a rightward or leftward distance from the center in the vehicle width direction, whereas the filter 53 provided at the lower end thereof may be situated at the center in the vehicle width direction.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle-ride type four-wheeled vehicle, comprising:
   an engine including:
      a crankcase;
      a cylinder located above the crankcase; and
      a head cover located on a top of the cylinder;
   a fuel tank located above the head cover; and
   a fuel pump disposed in the fuel tank; wherein
   a lower surface portion of the fuel tank includes, at a more forward position than the head cover, a deep bottom portion situated at a lowest position in the lower surface portion;
   an upper surface portion of the fuel tank includes, at a more rearward position than the deep bottom portion, an inclined portion arranged to extend rearward and obliquely downward;
   an upper end of the fuel pump is fixed to the inclined portion, and the fuel pump is arranged to extend forward and obliquely downward from the inclined portion toward the deep bottom portion; and
   a lowermost portion of the fuel pump is located more forward than the head cover of the engine.

2. The saddle-ride type four-wheeled vehicle according to claim 1, wherein the deep bottom portion is located lower than an upper surface of the head cover.

3. The saddle-ride type four-wheeled vehicle according to claim 1, further comprising a seat, wherein a front portion of the seat is located over the inclined portion of the fuel tank.

4. The saddle-ride type four-wheeled vehicle according to claim 1, wherein the fuel pump is located above the head cover.

5. The saddle-ride type four-wheeled vehicle according to claim 1, further comprising a body frame which comprises right and left extending portions extending obliquely upward and rearward and situated anterior to the fuel tank, wherein:
   the right and left extending portions are inclined so that a distance between the right and left extending portions decreases as the right and left extending portions extend upward, and upper ends of the right and left extending portions are coupled to each other to from a supporting portion for supporting a steering stem; and
   the fuel tank comprises a right front portion and a left front portion which are situated on right and left sides of the steering stem, respectively.

6. The saddle-ride type four-wheeled vehicle according to claim 1, wherein the head cover overlaps with the lowermost portion of the fuel pump in a horizontal direction of the saddle-ride type four-wheeled vehicle.

* * * * *